March 12, 1940.　　　F. R. HEWARD　　　2,193,333
VIGNETTER FOR CAMERAS
Filed Feb. 6, 1939
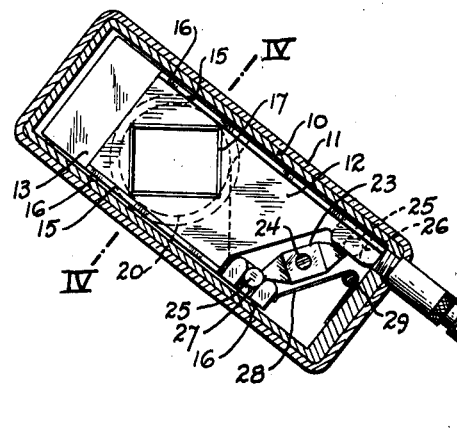
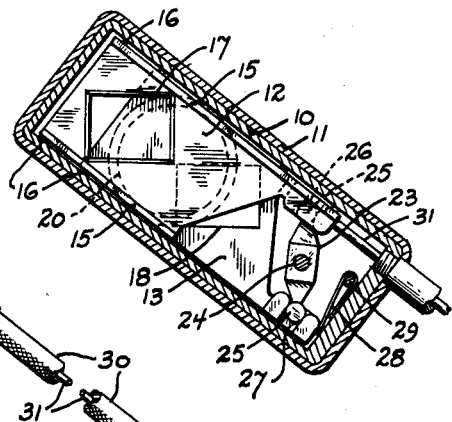
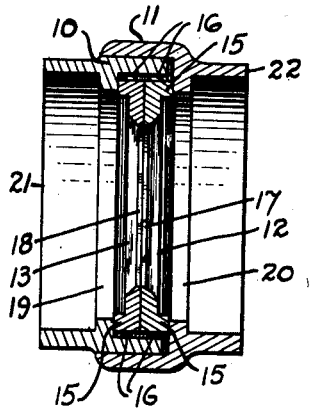
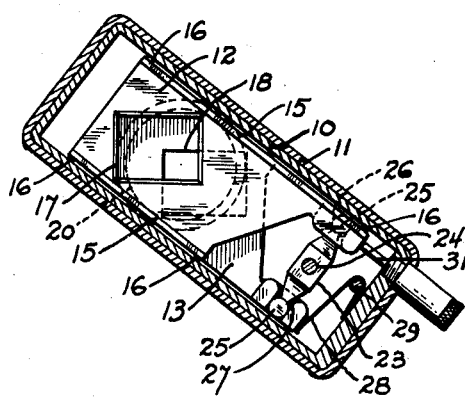
INVENTOR.
Frederick R. Heward.
BY
Chas. E. Townsend.
ATTORNEY.

Patented Mar. 12, 1940

2,193,333

UNITED STATES PATENT OFFICE 2,193,333

VIGNETTER FOR CAMERAS

Frederick R. Heward, San Francisco, Calif.

Application February 6, 1939, Serial No. 254,879

2 Claims. (Cl. 95—65)

The present invention relates to vignetters or devices to be used on cameras, and particularly in moving picture cameras, to vignette the pictures taken with the cameras.

A vignette effect may be produced on the film of a camera by placing a mask a short distance in front of the lens of the camera. The mask has an opening which is in line with the axis of the lens so that when the shutter is actuated to expose the film the mask produces a marginal shadow or unexposed frame for the picture. Due to the distance between the mask and the film, the penumbra of the shadow causes a gradual merging of the unexposed frame portion and fully exposed picture portion of the film, thus producing a vignette effect. If the size of the opening in the mask is changed, the size of the vignette is correspondingly changed. Gradual changing in the size of this opening during the filming of a moving picture results in the effects known as "fade-in" and "fade-out" by which the result of gradually increasing or decreasing the size of a picture projected upon a screen is produced.

It is the object of the present invention to provide a vignetter for cameras that will produce a vignetted picture of the same shape and relative proportions as the picture ordinarily taken by the camera, and that will be capable of operation through simple mechanism to vary the size of the vignetted picture from the full size of the film to the point where the picture has been completely masked.

One form of the invention is illustrated in the accompanying drawing, and further objects and advantages thereof are made apparent in the following specification, in which detailed reference is made to the drawing.

In the drawing:

Fig. 1 is a longitudinal sectional view of a vignetter embodying the invention and showing the parts thereof in normal position;

Fig. 2 is a view similar to Fig. 1, illustrating the position of the parts when they have been moved to what will be referred to as "closed position;"

Fig. 3 is a similar view showing the positions of the movable parts at a point intermediate the positions shown in Figs. 1 and 2; and Fig. 4 is a transverse section taken on the line IV—IV of Fig. 1.

The invention, as illustrated in the accompanying drawing, comprises a case 10 having a cover 11 which telescopes over the case 10 in the manner illustrated in Fig. 4 to form a rectangular, box-like interior compartment. A pair of mask plates 12 and 13 are carried within the case 10 for longitudinal sliding movement. These mask plates are adapted to slide in opposite directions, and have flat abutting surfaces as shown in Fig. 4. On their outer surfaces they are flanged at their edges, the flanges being shown at 15, so that the combined thickness of the plates at the edges is substantially that of the interior of the case to provide a snug, sliding fit. The top and bottom edges of the plates 12 and 13 may be provided with small raised bearing points 16 engageable with the inner walls of the case 10 to facilitate sliding of the plates with respect to said walls. The mask plates 12 and 13 are provided with rectangular openings 17 and 18, which openings register with each other when the plates are in their normal position as illustrated in Fig. 1 of the drawing, and register axially with the lens of a camera when the vignetter is in place thereon.

As best shown in Fig. 4, the case 10 and cover 11 are provided with circular openings 19 and 20, respectively, aligned with each other and aligned with the registering opening 17 and 18 in the mask plates 12 and 13.

In order that the case may be conveniently attached to the lens of a camera, outwardly projecting circular collars 21 and 22 are formed on the case 10 and cover 11. Either one or the other of these collars is adapted to embrace the lens housing of a camera and to be secured thereto by means of a suitable set screw, not shown, or any conventional connection such as a thread or bayonet lock. To adapt the vignetter to cameras having lens housings of different sizes, spacing bushings may be employed to fit within the collars 21 and 22. While it is normally necessary to use but one of these collars in order to support the vignetter in front of the camera lens, two collars are provided for the reason that with some cameras it is more convenient that the vignetter be placed at one angle, while in other cameras the opposite angle is more desirable; consequently, the collar will be selected for attachment which best suits the particular camera to which the vignetter is to be attached. For types of cameras that do not have a projecting lens housing adaptable to the attachment of a vignetter in this manner, any suitable bracket may be employed to support it in front of the camera with the rectangular openings in the mask plates aligned with the lens.

Referring to Fig. 1 of the drawing, plates 12 and 13 are shown as connected by means of a link 23 pivotally mounted on a pin 24 and having ball-shaped ends 25 lodged in sockets 26 and 27 of the plates 12 and 13. Through this connection movement of either of the plates 12 and 13 longitudinally of the case will effect equal movement of the other plate in an opposite direction and will result in the openings 17 and 18 being moved out of registry with each other until the mask plates assume their fully closed position, as illustrated in Fig. 2, where no light passes through the case into the lens of the camera.

The proportion of the rectangular openings 17 and 18 in the mask plates is approximately 3 by 4 to correspond to the proportion of standard motion picture film. Consequently, by supporting the case at an angle of approximately 53 degrees from vertical, with the openings disposed horizontally as shown, and moving the plates in the direction of this angle, the center of the rectangular opening, regardless of its size, will always be maintained at the same point. The result is, as illustrated in Fig. 3 of the drawing, that when the plates 12 and 13 are moved to a point intermediate the full open position of Fig. 1 and the full closed position of Fig. 2, the rectangular frame, reduced in size by the relative movement of the openings 17 and 18, maintains the proportion of 3 by 4 and has a center common with the center of the full-size opening shown in Fig. 1, and coaxial with the camera lens. Consequently, relative movement of the plates 12 and 13 produces a gradual and uniform diminishing of the area of the camera film which is exposed to light. By gradually moving the plates 12 and 13 between the positions illustrated in Figs. 1 and 2, the effects known as "fade-in" and "fade-out" are therefore produced.

A spring 28 supported by a boss 29 within the case bears against one end of the plate 13 and, by virtue of the connecting link 23, urges both plates to the normal or open position illustrated in Fig. 1. In order to move the plates manually toward their closed position, a flexible cable 30 is secured to the case and a wire 31 slidable in and guided by the cable 30 is adapted to be projected into the case and against the end of the plate 12 to effect movement of the plates in opposition to the spring 28. The usual flange 32 is fitted to the outer end of the cable 30 so that it may be held between the fingers while the thumb of the operator is employed to depress a button 33 secured to the end of the wire 31.

The case 10 and cover 11, as well as the plates 12 and 13, are preferably constructed of a molded material, there being many thermoplastic substances suitable for this purpose, and they may be secured together by any conventional means; for example, the pin 24 upon which the link 23 pivots may be in the form of a screw passing through the cover and having one end threaded into the case to hold these parts in their assembled position.

The vignetter as herein described may be conveniently attached to any standard form of camera, and through the simple operation of the button 33 is effective to vignette a picture to any size desired or to produce "fade-in" and "fade-out" effects with any degree of speed. Owing to the fact that the variable sized mask produced by the openings 17 and 18 is positioned a short distance in front of the camera lens, a hazy or penumbral effect is produced on the film surrounding the vignette. While the vignette is rectangular in shape, due to the shape of the openings, the corners may be rounded or otherwise modified by slight modifications in construction of the openings.

The foregoing description is more or less specific for purposes of illustrating the invention, but it is not intended to limit the invention to the particular form disclosed, as the scope of the invention is limited only by the appended claims.

Having thus described my invention, what I claim and desire to secure by Letters Patent is:

1. A vignetter for cameras comprising a case, a cover adapted to telescope over said case to form a rectangular box-like interior compartment, said cover and case having aligned openings, a pair of mask plates slidably carried by said compartment and having openings registering with the openings in the cover and case and adapted upon sliding of said plates to form an aperture of variable size, said mask plates being slightly smaller in cross sectional dimensions than said compartment and having bearing members projecting from their edges to provide sliding contact with the inner walls of the compartment.

2. A vignetter for cameras comprising a case, a cover adapted to telescope over said case to form a rectangular box-like interior compartment, said cover and case having aligned openings, a pair of mask plates slidably carried by said compartment and having openings registering with the openings in the cover and case and adapted upon sliding of said plates to form an aperture of variable size, said mask plates being slightly smaller in cross sectional dimensions than said compartment and having bearing members projecting from their edges to provide sliding contact with the inner walls of the compartment, a link centrally pivoted within said compartment and engaging both of said mask plates to confine them to equal and opposite movement, and a screw passing through the compartment to retain the case and cover against separation and to serve as a pivot for said link.

FREDERICK R. HEWARD.